United States Patent [19]

Held

[11] 4,299,551

[45] Nov. 10, 1981

[54] BELT TENSIONING AND CONTROL FOR DOUBLE BELT PRESSES

[76] Inventor: Kurt Held, Alte Strasse 1, D-7218 Trossingen 2, Fed. Rep. of Germany

[21] Appl. No.: 120,878

[22] Filed: Feb. 12, 1980

[30] Foreign Application Priority Data

Jan. 27, 1979 [DE] Fed. Rep. of Germany ....... 2903180

[51] Int. Cl.³ ........ B29C 15/00

[52] U.S. Cl. ........ 425/371

[58] Field of Search ........ 425/371

[56] References Cited

U.S. PATENT DOCUMENTS

| | | | |
|---|---|---|---|
| 4,015,921 | 4/1977 | De Mets | 425/371 |
| 4,017,248 | 4/1977 | Dieffenbacher et al. | 425/371 |
| 4,140,455 | 2/1979 | De Mets | 425/371 |

*Primary Examiner*—J. Howard Flint, Jr.
*Attorney, Agent, or Firm*—Spencer & Kaye

[57] ABSTRACT

A support element for supporting a rotatable belt in a double belt press, which element includes a central portion presenting a reaction zone in which pressing forces are generated and end portions enclosing the central portion and defining belt return regions for the rotatable belt, is composed of a first part defining the central portion, a second part defining one end portion coextensive with the first part along a meeting plane and movable relative to the first part, components establishing a pivot connection between the parts along one edge of the meeting plane, and two piston-cylinder units mounted between the parts in the vicinity of the edge of the meeting plane opposite the one plane and spaced apart in a direction parallel to the axis of the pivot connection between the parts, the units being arranged to pivot the parts away from one another under the action of pressure medium in the cylinders of the units and to produce respectively different operating forces.

5 Claims, 3 Drawing Figures

BELT TENSIONING AND CONTROL FOR DOUBLE BELT PRESSES

BACKGROUND OF THE INVENTION

The present invention relates to structures employed in double belt presses for simultaneously tensioning and controlling the stationary and rotating belts.

In double belt presses operating according to the rolling bed principle, a compression force is generated in a reaction zone between rotating belts which are driven externally via their edges. The belts are supported by a stationary supporting structure via a succession of roller bearings from a roller bed for each belt. The forces generated in the reaction zone as well as the driving or friction forces are transmitted to the supporting structure through each roller bed. This state of the art is disclosed in my U.S. Application Ser. No. 114,673, filed Jan. 23, 1980 for CONTINUOUS LAMINATING MACHINE and corresponding to German Application No. P 27 37 629.0 of Aug. 20, 1977.

The solution disclosed in those applications for tensioning presents certain drawbacks in that it is not as economical as it could be, and is not suitable for influencing, i.e., controlling, the direction of movement of the belts through the reaction zone. However, such control is necessary if specific, high pressures are to be established in the reaction zone of the double belt press or if, for example, flaws occur in the geometric configuration of the supporting structure as a result of deformations.

SUMMARY OF THE INVENTION

It is an object of the present invention to effect tensioning and controlling of the belts in a structurally simple manner.

This and other objects are achieved, according to the invention, in a support element for supporting a rotatable belt in a double belt press, which element includes a central portion presenting a reaction zone in which pressing forces are generated and end portions enclosing the central portion and defining belt return regions for the rotatable belt, by constructing the element to include: a first part defining the central portion; and second part defining one end portion coextensive with said first part along a meeting plane and movable relative to the first part; means establishing a pivot connection between the parts along one edge of the meeting plane; and two piston-cylinder units mounted between the parts in the vicinity of the edge of the meeting plane opposite the one plane and spaced apart in a direction parallel to the axis of the pivot connection between the parts, the units being arranged to pivot the parts away from one another under the action of pressure medium in the cylinders of the units and to produce respectively different operating forces. In arrangements of the type contemplated by the invention, each end portion has a semicylindrical form.

In accordance with the invention, the above-described structural arrangement can be provided for one or both of the end portions.

According to a particular preferred embodiment of the invention, the support element is further provided with: a plurality of rolling elements mounted to roll around the periphery of the support element and to be enclosed by, and support, the rotatable belt; means located at one of the end portions of the support element for guiding the ends of the rolling elements, the guiding means being composed of two annular gear wheels located adjacent opposite respective ends of the rolling elements and mounted for rotation about an axis coaxial with the path of movement of the rotatable belt about the one end portion, each gear wheel being associated with a respective end of the rolling elements and having external teeth between which the associated ends of respective rolling elements engage; and means connected for varying the angular position of one gear wheel relative to the other for causing the axes of the rolling elements to be inclined to the axis of gear wheel rotation and thus influencing the lateral movement forces imposed on the rotatable belt. A closed control loop can be provided for controlling the direction and amount of the inclination imparted to the axes of the rolling elements.

Here again, such structure can be provided at one or both of the end portions.

The solution according to the present invention permits the automatic regulation of the rotating belt movement independent of the geometric configuration of the supporting body, of the rolling elements and of the belts.

DESCRIPTION OF THE PREFERRED EMBODIMENTS

Figure 1:
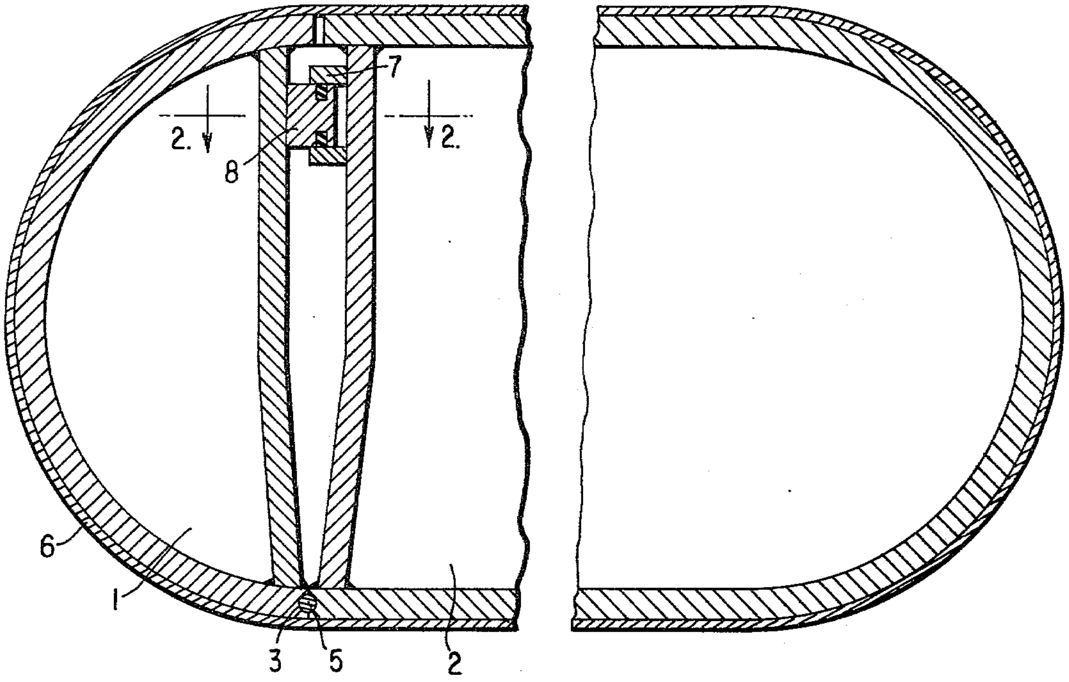
FIG. 1 is a cross-sectional view of a preferred embodiment of a belt tensioning and control arrangement according to the invention, taken along a line 1—1 of FIG. 2.
Figure 2:
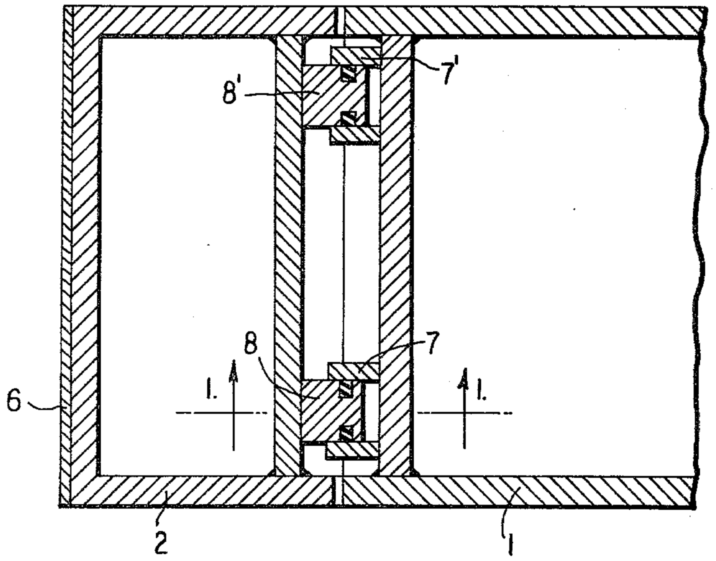
FIG. 2 is a cross-sectional plan view along line 2—2 of FIG. 1.

FIG. 1 is a sectional, elevational view perpendicular to the longitudinal axis of the upper supporting element of the supporting structure of a double belt press. The supporting element includes two semi-cylindrical end portions enclosing a rectilinear portion having a planar face defining the reaction zone for the press. Each semi-cylindrical portion is outside of the reaction zone. The supporting element is enclosed by a rotating belt 6 for which the semi-cylindrical belt portions provide belt return regions.

According to the invention, the supporting element is constituted by a first part 1 constituting one semi-cylindrical portion and a second part 2 constituting the rest of the element.

Between parts 1 and 2, and at the side of the supporting element presenting the reaction zone, i.e. facing the other supporting element, there is provided a cylindrical centering rod 5 fitted into an abutment groove 3 formed of a semi-cylindrical groove portion in each of parts 1 and 2. The entire arrangement is enclosed by the rolling belt face 6. For reasons of simplicity, FIG. 1 does not show the rolling elements rolling on this belt face, the spacer profiles or the details outer rolling steel belt.

Between the parts 1 and 2 there are attached, at the side remote from the reaction zone region and adjacent each lateral edge of the belt, pressure oil actuated tensioning cylinders 7 and 7' having associated pistons 8 and 8' connected to part 1. Pressure in cylinders 7 and 7' presses the belt return part 1 which is mounted to be rotatable about the centering rod 5, away from the supporting body 2 to tension the moving belt 6. If the two cylinders are actuated with respectively different pressures, the belt return part 1 is deformed into an approximately conical configuration. Such a deformation alters the direction of movement of the rolling elements and thus also the direction of movement of the rotating belt.

If, due to high thermal or static errors in the shape of the supporting elements, correspondingly high errors in movement of the belt must be corrected, an oppositely directed controlling deformation of part 1 might not be sufficient and must be aided by putting the rolling elements into an oblique orientation before they enter the reaction zone.

Figure 3:
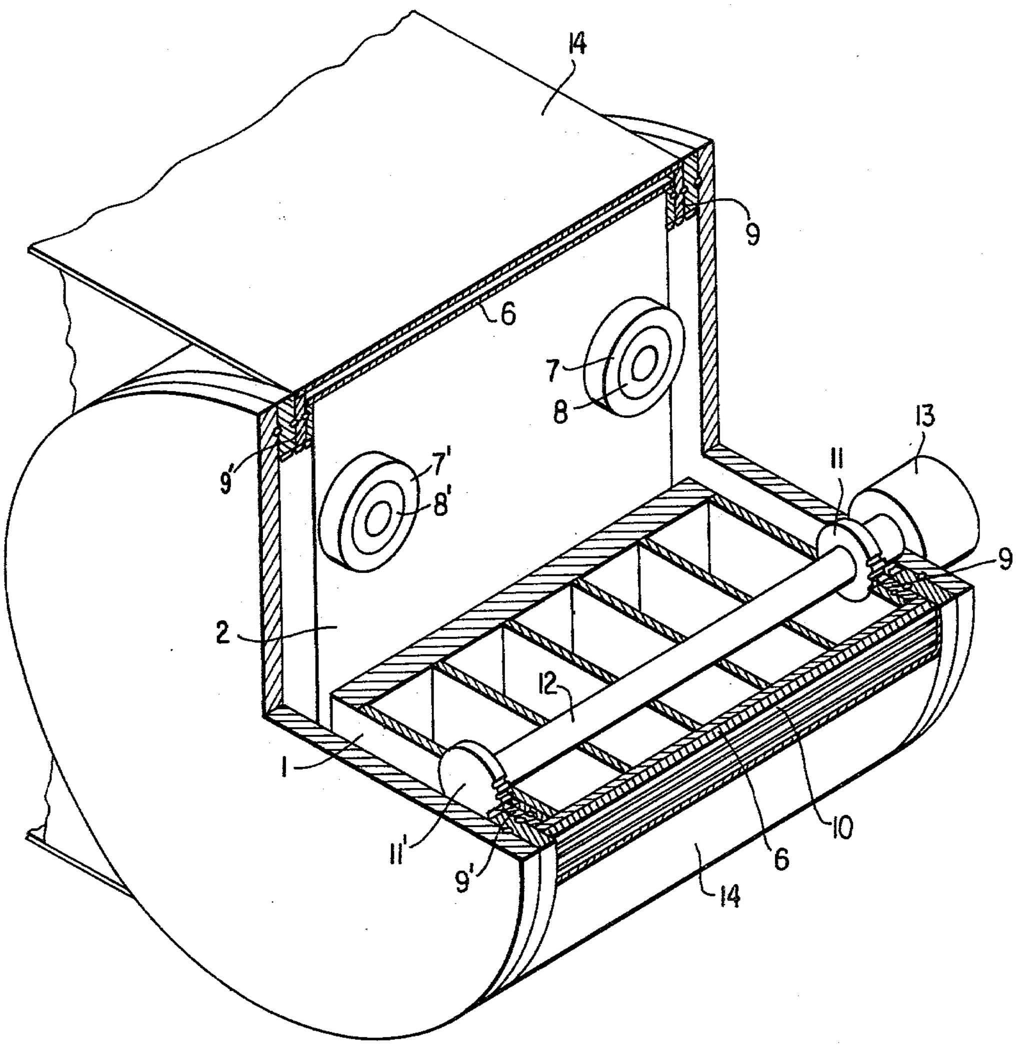
FIG. 3 is a cut-away perspective view of the embodiment of FIG. 1.

FIG. 3 shows, in an axiometric projection and partly cut away, the belt return part 1, the supporting part 2, the stationary belt 6, the tensioning cylinders 7, 7′ with the tensioning pistons 8, 8′, and hollow toothed wheels 9 and 9′ concentric with part 1 and having external teeth between which rolling elements 10 are guided. Elements 10 support a movable belt 14 which travels relative to belt 6 to carry material to be compressed through the reaction zone.

Wheels 9 and 9′ further have internal teeth which mesh with external teeth on wheels 11 and 11′. These rolling elements are connected together in a form-locking manner by means of a synchronous shaft 12, which is rotatable in a controlled manner.

The rolling elements 10 are centered in the external tooth gaps of wheels 9 and 9′. Controlled rotation of the hollow toothed wheels 9, 9′ relative to one another which causes the rolling elements 10 to be put into an oblique orientation with respect to the direction of movement and thus imparts a tendency to sidewise movements to the outer traveling belt 14 and thus influences the position of the outer belt edge in the machine.

The device 13 for the controlled, form-locking rotation is shown only schematically. It could be replaced by separately acting and controlled worm gears 11 and 11′ whose direction of rotation is made dependent on the direction of movement of the belt.

If monitoring of the position of the outer belt edge indicates that there is an undue deviation from the desired position the hollow toothed wheels 9, and 9′ are rotated with respect to one another via the device 13, the synchronous shaft 12 and the frontal toothed wheels 11, 11′ so that the rolling elements roll in a direction oblique to the direction of movement, resulting in a lateral position deviation opposite to that originally measured.

It will be understood that the above description of the present invention is susceptible to various modifications, changes and adaptations, and the same are intended to be comprehended within the meaning and range of equivalents of the appended claims.

What is claimed is:

1. In a support element for supporting a rotatable belt in a double belt press, which element includes a central portion presenting a reaction zone in which pressing forces are generated and end portions enclosing the central portion and defining belt return regions for the rotatable belt, the improvement wherein said element comprises: a first part defining said central portion; a second part defining one said end portion coextensive with said first part along a meeting plane and movable relative to said first part; means establishing a pivot connection between said parts along one edge of the meeting plane; and two piston-cylinder units mounted between said parts in the vicinity of the edge of the meeting plane opposite the one plane and spaced apart in a direction parallel to the axis of the pivot connection between said parts, said units being arranged to pivot said parts away from one another under the action of pressure medium in the cylinders of said units and to produce respectively different operating forces.

2. An arrangement as defined in claim 1 wherein said pivot connection is located adjacent the location of said reaction zone.

3. An arrangement as defined in claim 1 or 2 wherein said means defining a pivot connection includes two semicircular grooves each formed in a respective part adjacent said meeting plane and aligned with one another, and a pivot rod seated in said grooves.

4. An arrangement as defined in claim 3 wherein said pivot connection presents a pivot axis parallel to the belt plane and transverse to the direction of belt travel.

5. An arrangement as defined in claim 1 further comprising: a plurality of rolling elements mounted to roll around the periphery of said support element and to be enclosed by, and support, the rotatable belt; means located at one of the end portions of said support element for guiding the ends of said rolling elements, said guiding means being composed of two annular gear wheels located adjacent opposite respective ends of said rolling elements and mounted for rotation about an axis coaxial with the path of movement of the rotatable belt about said one end portion, each said gear wheel being associated with a respective end of said rolling elements and having external teeth between which the associated ends of respective rolling elements engage; and means connected for varying the angular position of one said gear wheel relative to the other for causing the axes of said rolling elements to be inclined to the axis of gear wheel rotation and thus influencing the lateral movement forces imposed on the rotatable belt.

* * * * *